United States Patent
Gomm et al.

(10) Patent No.: US 12,543,252 B2
(45) Date of Patent: Feb. 3, 2026

(54) SYSTEMS AND METHODS FOR DETERMINING DIMMING PROFILES

(71) Applicant: Snap One, LLC, Salt Lake City, UT (US)

(72) Inventors: Thomas Seal Gomm, Sandy, UT (US); Jeffrey Glenn Thomas, Draper, UT (US)

(73) Assignee: Snap One, LLC, Salt Lake City, UT (US)

( * ) Notice: Subject to any disclaimer, the term of this patent is extended or adjusted under 35 U.S.C. 154(b) by 207 days.

(21) Appl. No.: 18/091,678

(22) Filed: Dec. 30, 2022

(65) Prior Publication Data

US 2024/0224399 A1 Jul. 4, 2024

(51) Int. Cl.
*H05B 47/11* (2020.01)
*H05B 45/10* (2020.01)
*H05B 45/14* (2020.01)
*H05B 47/19* (2020.01)

(52) U.S. Cl.
CPC ............. *H05B 47/11* (2020.01); *H05B 47/19* (2020.01)

(58) Field of Classification Search
CPC ........ H05B 45/10; H05B 47/11; H05B 47/19; H05B 47/196; H05B 1/0283; H05B 45/12; H05B 45/20; H05B 47/175; H05B 33/14; H05B 47/16; H05B 47/1965; H05B 3/03
See application file for complete search history.

(56) References Cited

U.S. PATENT DOCUMENTS

| | | | |
|---|---|---|---|
| 2015/0076991 A1* | 3/2015 | Yamamoto | H05B 47/19 315/153 |
| 2016/0323972 A1* | 11/2016 | Bora | H05B 47/105 |
| 2017/0135185 A1* | 5/2017 | Dünser | H05B 47/105 |
| 2022/0210890 A1* | 6/2022 | Slivka | H05B 45/10 |

* cited by examiner

*Primary Examiner* — Wei (Victor) Y Chan
(74) *Attorney, Agent, or Firm* — Greenberg Traurig, LLP; Nicholas Martin; David J. Dykeman

(57) ABSTRACT

An electronic device is described. The electronic device includes a dimming profile processor. The dimming profile processor is configured to receive light sensor data from a light sensor. The light sensor data indicates measurements of light produced by a lighting load over a range of dimming settings. The processor is also configured to determine a dimming profile based on the light sensor data and dimming settings data.

19 Claims, 7 Drawing Sheets

SYSTEMS AND METHODS FOR DETERMINING DIMMING PROFILES

TECHNICAL FIELD

The present disclosure relates generally to electrical devices. More specifically, the present disclosure relates to systems and methods for determining dimming profiles.

BACKGROUND

In recent years, the price of electrical devices has decreased dramatically. In addition, the size of electrical devices has continued to decrease. Further, electrical devices continue to increase in capability and convenience.

Decreasing prices and increasing capabilities of electrical devices has permitted modern devices to be conveniently used in homes and businesses. Many homes and businesses include multiple electrical devices to assist in everyday tasks. For example, electrical devices may be used for convenience and/or entertainment.

While some electrical devices may provide convenience and entertainment, many also require control. Moreover, these electrical devices consume electrical power. As can be observed from this discussion, improvements to electrical device control may be beneficial.

DETAILED DESCRIPTION

Figure 1:
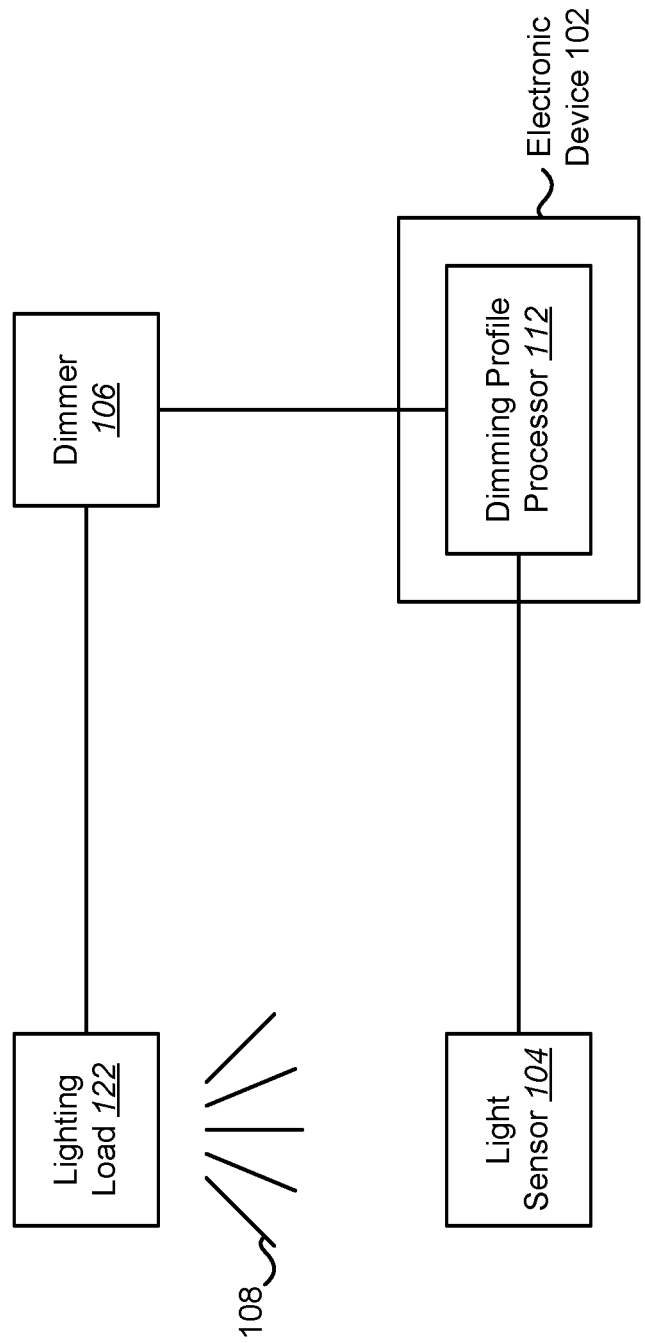
FIG. 1 is a block diagram illustrating one configuration of an electronic device for determining a dimming profile.

An electronic device is described. The electronic device includes a dimming profile processor configured to receive light sensor data from a light sensor. The light sensor data indicates measurements of light produced by a lighting load over a range of dimming settings. The dimming profile processor is also configured to determine a dimming profile based on the light sensor data and dimming settings data.

The dimming profile processor may be configured to control a dimmer to drive the lighting load over the range of dimming settings. The light sensor data and the dimming settings data may be captured in response to a trigger from a user interface.

The dimming profile may indicate a reduced range of the dimming settings. The dimming profile processor may be configured to determine the dimming profile by determining a first dimming setting at which the light sensor data indicates activation of the lighting load. The dimming profile processor may be configured to determine the dimming profile by determining a second dimming setting at which the light sensor data and the dimming settings data indicate a slope less than a slope threshold. The dimming profile processor may be configured to determine the dimming profile by determining a dimming curve.

The dimming profile processor may be configured to determine a lighting load identifier. The dimming profile processor may also be configured to determine a default dimming profile based on the lighting load identifier.

The electronic device may be an automation controller. The electronic device may be a mobile device. The electronic device may be a dimming device.

The light sensor may be included in a mobile device. The light sensor may be included in a stationary device.

A method is also described. The method includes receiving, by an electronic device, light sensor data from a light sensor. The light sensor data indicates measurements of light produced by a lighting load over a range of dimming settings. The method also includes determining, by the electronic device, a dimming profile based on the light sensor data and dimming settings data.

A first device is also described. The first device includes circuitry including at least a processor, a transmitter, a receiver, and a light sensor. The first device is configured to generate light sensor data according to a signal output by the light sensor. The signal output by the light sensor indicates measurements of light emitted from a lighting load. The light sensor data indicates a first set of the measurements of light emitted from the lighting load over a first range of dimming settings. The first device is also configured to determine a dimming profile based on the light sensor data and dimming settings data. The first device is further configured to transmit a signal including information indicating the determined dimming profile to a second device via a network connection with the second device. The first device may be a mobile device. The light sensor may be included in the mobile device.

"Dimming" refers to controlling an amount and/or level of brightness of a light source. For instance, dimming may be performed on a lighting load (e.g., a light emitting diode (LED) light bulb) to control an amount of brightness produced by the lighting load. For example, an amount of light brightness produced by a lighting load may be controlled by adjusting an amount of current and/or voltage supplied to the lighting load.

Some examples of the techniques described herein may relate to determining dimming profiles. A dimming profile is data to control dimming of a lighting load. For instance, a dimming profile may relate a dimming setting (e.g., a quantity on a brightness scale, a percentage, a number, a descriptor such as "Low," "Medium," "High," etc.) to an electrical quantity (e.g., voltage, current, phase angle, phase cut quantity (for phase-cut dimming), duty cycle (for pulse-width modulation (PWM)), and/or frequency (for pulse-frequency modulation (PFM)), etc.) to drive a lighting load. A dimmer may utilize a dimming profile to drive a lighting load.

In some examples, a light sensor (e.g., a light sensor in a device such as a camera on a mobile phone, light meter, or other device) may be used to sense or read light output levels (e.g., measurements of brightness) as a dimmer controlling a light source (e.g., lighting load, light fixture, bulb, LED tape light, etc.) drives (e.g., ramps, fades, fades in, fades out, and/or varies, etc.) the light source through a dimming range (e.g., a dimmer's full default dimming range from 0 to 100%). In some examples, an application may be utilized to control the dimmer and may utilize the light levels received by the light sensor to determine a dimming profile. For instance, the application may determine a relationship between brightness settings and electrical quantities, where the dimming profile may be utilized by the dimmer to provide dimming control for the load connected to the dimmer.

In some examples, a light sensor may be (or may be included in) a camera on a mobile phone that utilizes a mobile application. In some examples, a light sensor may be an independent light level sensing device that may output data via an interface (e.g., Bluetooth, Ethernet, Wi-Fi, Universal Serial Bus (USB), etc.) to another device. The data may be utilized by an application on the other device to determine the dimming profile.

In some examples, a dimming profile may include a first dimming level (e.g., minimum active dimming level), a second dimming level (e.g., maximum dimming level), and/or a dimming curve. For instance, an electronic device may determine a first dimming level (e.g., minimum active dimming level), a second dimming level (e.g., maximum dimming level), and/or a dimming curve. The dimming profile (e.g., first dimming level, second dimming level, and/or dimming curve) may enable the dimmer to control the lighting load such that the dimming range and dimming curve provide a target lighting load behavior over a dimmable range.

In some examples, a dimming profile and/or dimming curve may include (and/or may be specific to) phase-cut dimming. For example, switching circuitry in a dimmer may activate and/or deactivate a load (periodically and/or cyclically, for instance) in order to achieve a particular dimming level. This may be referred to as "phase-cut" dimming, where different amounts (e.g., time segments, portions, etc.) of load voltage may be cut (e.g., deactivated) in order to produce different dimming levels. When no portion of the load voltage is cut, the load may be driven in a fully activated state, where the full cycle of load voltage is provided. This may be referred to as a "full-on" (e.g., 100%) dimming level (e.g., a dimming level of no dimming). A range of cycle portions may be cut according to dimming level. For example, a half (e.g., 50%) dimming level may cut approximately half of the load voltage cycle. Other dimming levels (e.g., 0%, 25%, 33%, 75%, 90%, etc.) may similarly be achieved by controlling the switching circuitry to cut corresponding portions from the load voltage cycle. Some examples of the techniques described herein may be implemented with phase-cut dimming.

Determining the first dimming level (e.g., minimum active dimming level) may reduce and/or eliminate a delay from an off state to a low (e.g., approximately minimum active) light output. Without setting a first dimming level on a dimmer, for example, the light output might remain off while the dimming ramps up and then may suddenly turn on to a light level above a target level, instead of gradually ramping the light level up from no light. Setting the first dimming level may reduce or eliminate flicker at low light levels.

Determining the maximum light level may reduce or eliminate a lack of perceived light output change at higher dimming levels. Without setting a maximum light level, for instance, light output may not increase beyond a dimming level, may increase imperceptibly beyond a dimming level, or may increase within a range (e.g., small range) beyond a dimming level. In some examples, maximum light output may be reached before the 100% dimming level.

Determining a dimming curve (rather than using a default dimming curve, for example) may improve the perception of dimming light levels throughout the dimming range. In some examples, the target dimming curve may be linear, logarithmic, or customized. In some examples, the target dimming curve may depend on the hardware involved in dimming (e.g., dimmer and/or light load(s)).

As used herein, the term "couple" and other variations thereof (e.g., "coupled," "coupling." etc.) may mean that one element is connected to another element directly or indirectly. For example, if a first element is coupled to a second element, the first element may be connected directly to the second element (without any intervening element, for example) or may be connected to the second element through one or more other elements. A line(s) in one or more of the Figures (e.g., in the block diagrams) may indicate a coupling(s) and/or communication link(s). A coupling may be accomplished with one or more conductors (e.g., one or more wires). A communication link may be established with a wired link and/or wireless link. For instance, elements may communicate over a wired and/or wireless network (e.g., Ethernet network, Wi-Fi network, mesh network, Zigbee network, local area network (LAN), personal area network (PAN), wide area network (WAN), the Internet, etc.).

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the Figures, is not intended to limit scope, as claimed, but is merely representative of the systems and methods. As used herein, the term "plurality" may indicate two or more. For example, a plurality of components may refer to two or more components.

FIG. 1 is a block diagram illustrating one configuration of an electronic device 102 for determining a dimming profile. The electronic device 102 is a device that includes electronic circuitry. Examples of an electronic device 102 include an electronic circuit, integrated circuit, circuit with discrete components (e.g., one or more resistors, capacitors, transistors, and/or metal-oxide-semiconductor field-effect transistors (MOSFETs), triodes for alternating current (TRIACs), and/or variable transformers (e.g., variable alternating current (VARIAC®)) etc.), computing device, and/or device that includes one or more processors, memory cells, latches, logic gates, etc. For instance, the electronic device 102 may be a smartphone, tablet device, smart speaker, light meter, automation controller, or wall-mounted device (e.g., dimmer switch, etc.).

The electronic device 102 may include a dimming profile processor 112. The dimming profile processor 112 is a processor to determine a dimming profile. Examples of the dimming profile processor 112 include a central processing unit (CPU), microprocessor, application processor, logic circuit, controller circuit, state machine, etc. The dimming profile processor 112 may include and/or access software in memory and/or firmware. For example, the electronic device 102 may include memory. The memory may be included on-board the dimming profile processor 112 or may be separate from the dimming profile processor 112. The memory may store instructions (e.g., dimming profile determination instructions) and/or data (e.g., light sensor data, measurements, dimming setting data, dimming profile data, first dimming level data, second dimming level data, and/or dimming curve data, etc.).

The dimming profile processor 112 may communicate with a light sensor 104 and/or a dimmer 106. In some examples, the dimming profile processor 112 may be coupled to (and/or may be in communication with) the light sensor 104 and/or the dimmer 106. The light sensor 104 is a device to sense light. For instance, the light sensor 104 may measure light (e.g., light brightness). Examples of the light sensor 104 may include an image sensor, camera module, light detector, etc. The dimmer 106 is a device to dim a lighting load 122. Examples of the dimmer 106 may include dimming circuitry (e.g., MOSFET-based dimming circuitry), a dimming switch, phase-cut dimmer, adjustable current source, etc. In some examples, the light sensor 104 and/or the dimmer 106 may be included in the electronic device 102. In some examples, the light sensor 104 and/or the dimmer 106 may be separate from the electronic device 102.

In some examples, the light sensor 104, the dimming profile processor 112, and/or the dimmer 106 may be included in separate devices. For instance, the light sensor 104 may be included in a first device (e.g., mobile device, smartphone, tablet device, laptop computer, light meter, smart speaker, security camera, web camera, etc.), the dimming profile processor 112 may be included in a second device (e.g., automation controller, desktop computer, server, etc.), and the dimmer 106 may be included in a third device (e.g., dimmer device, light switch, lighting controller, etc.).

In some examples, the light sensor 104, the dimming profile processor 112, and/or the dimmer 106 may be combined in a device(s). For instance, the light sensor 104 and the dimming profile processor 112 may be included in a mobile device (e.g., the electronic device 102 may be the mobile device) that communicates with the dimmer 106 (e.g., dimming device). In some examples, the light sensor 104, the dimming profile processor 112, and the dimmer 106 may be included in a dimming device (e.g., the electronic device 102 may be a dimming device). In some examples, the dimmer 106 and the light sensor 104 may be included in a dimming device and the electronic device 102 may be a separate device (e.g., automation controller).

In some examples, the light sensor 104, dimming profile processor 112, and/or dimmer 106 may be included in a stationary device (e.g., dimming device, automation controller, motion detector, wall device, etc.). In some examples, the light sensor 104, dimming profile processor 112, and/or dimmer 106 may be included in a mobile device.

Various examples of device arrangements in accordance with some of the techniques described here are given as follows. In some examples, the electronic device 102 is a mobile device (e.g., smartphone, tablet device, laptop computer, etc.). For instance, the electronic device 102 may be a smartphone that includes the light sensor 104 (e.g., a camera capable of producing light sensor data) and the dimming profile processor 112. In some examples, the electronic device 102 may communicate with the dimmer 106 directly or through another device (e.g., automation controller). For instance, the electronic device 102 may be a mobile device that includes the light sensor 104, and the mobile device may communicate with the dimmer 106 via an automation controller.

In some examples, the electronic device 102 may be an automation controller. For instance, the light sensor 104 may be included in a separate device (e.g., mobile device, smart speaker, light meter, etc.), which may send light sensor data to the automation controller. In some examples, the electronic device 102 may be a dimmer switch that includes the dimmer 106 and/or the light sensor 104. The dimmer switch may send light sensor data to the electronic device 102 and/or may be controlled by the electronic device 102. While some examples are given herein, other arrangements may be utilized in some examples.

In some examples, the dimming profile processor 112 may control the dimmer 106 to drive the lighting load 122 over a range of dimming settings. For instance, the dimming profile processor 112 may send dimming settings data to the dimmer 106. Dimming settings data is data indicating dimming settings. For instance, dimming settings data may indicate a sequence of dimming settings. In response to the dimming settings data, the dimmer 106 may produce a drive signal (e.g., current) that varies in accordance with the dimming settings indicated by the dimming settings data, where the drive signal is provided to the lighting load 122. In some examples, the dimmer 106 may drive the lighting load 122 in a series of levels (e.g., steps) corresponding to a series of dimming settings indicated by the dimming settings data. In some examples, the dimming settings may be adjusted in a time pattern (e.g., a series of periodic steps). For instance, the dimming settings may be stepped from 0% to 100% (of a driving current range, for example) in 1% steps at 50 millisecond increments. Other step sizes and/or increment sizes may be utilized in some approaches. In some examples, the dimming setting adjustments (e.g., sweep) may be repeated and/or rotated (e.g., proceeding in ascending order followed by descending order, etc.). The lighting load 122 may produce light 108 in accordance with the drive signal from the dimmer 106.

The light sensor 104 may sense the light 108 produced by the lighting load 122. For example, the light sensor 104 may produce light sensor data that indicates measurements of light 108 (e.g., brightness) produced by the lighting load 122 over the range of dimming settings. For instance, the light sensor data may indicate a measurement(s) in nits, lux, lumens, luminance channel value, luminous flux, and/or candela, etc. The light sensor data may be provided to the dimming profile processor 112 (e.g., electronic device 102). In some examples, a type of light sensor 104 (e.g., light sensor gain and/or light sensor quality) may impact light measurement type, light measurement accuracy, measurement discretization, etc. In some examples, the light sensor 104 may be calibrated to enhance measurement accuracy. In some examples, multiple light sensors (e.g., multiple cameras on a mobile device, a light sensor in a smart speaker in combination with a light sensor in a surveillance camera and a light sensor in a wall device, etc.) may be utilized.

The dimming profile processor 112 may receive the light sensor data from the light sensor 104. In some examples, light measurements (e.g., light sensor data) from multiple light sensors may be averaged (by the dimming profile processor 112, for instance). In some examples, a light sensor may be selected from multiple light sensors. For instance, a light sensor with greater sensitivity, with greater measurement range, and/or with a better field of view (e.g., non-occluded field of view) may be selected by the dimming profile processor 112.

The dimming profile processor 112 may determine a dimming profile based on the light sensor data and the dimming settings data. In some examples, the dimming profile processor 112 may determine a correspondence between the light sensor data and the dimming settings data. The correspondence may map the light sensor data to the dimming settings data (e.g., may map a light sensor measurement to a dimming setting that produced the measured light). In some examples, the light sensor data may be time stamped by the light sensor 104 (and/or by the electronic device 102 and/or by the dimming profile processor 112) to indicate a time for each light sample. The dimming profile processor 112 may determine a correspondence (e.g., light sample(s) corresponding to each dimming setting). For instance, the dimming profile processor 112 may record a time at which each dimming setting was sent and/or performed by the dimmer 106. A light sample with a time stamp between times of a former dimming setting and a latter dimming setting may correspond to the former dimming setting. In some examples, the dimming profile processor 112 may determine a delay between adjustment of a dimming setting and a measurable change in the light sensor data in response to the dimming setting adjustment. For instance, the dimming profile processor 112 may send a dimming setting adjustment to the dimming to a set level (e.g., 50%) at a first time and may determine a second time when light sensor data indicates the adjustment (e.g., when light sensor data stabilizes after the adjustment). The difference between the first time and the second time may indicate a delay between the dimming settings data (e.g., adjustment) and light sensor data (e.g., measurement). In some examples, the delay may be applied to align the dimming settings data with the light sensor data.

In some examples, the dimming profile processor 112 may determine a correspondence between light sensor data and dimming settings data based on a dimming pattern of the dimming setting data (e.g., sweep). A dimming pattern may provide an indication that may be utilized to determine a correspondence between the light sensor data and the dimming settings data. For instance, a dimming pattern may include stepping the dimming settings from a global minimum (e.g., 0%) up to a first turning point (e.g., local maximum, 50%, etc.), stepping the dimming settings down to a second turning point (e.g., local minimum, 40%, etc.), and stepping the dimming settings up to a global maximum (e.g., 100%). In some examples, the dimming pattern may include stepping a dimming setting(s) with a different increment (e.g., 75 milliseconds (ms) for one dimming setting with 50 ms for the other dimming settings). The dimming profile processor 112 may correlate the dimming pattern with the light sensor data to determine the correspondence between the light sensor data and dimming settings data (e.g., to determine which light sample(s) corresponds to which dimming setting, to align the light sensor data with the dimming settings data, etc.). An alignment (e.g., time delay) with a highest correlation may indicate the correspondence between the light sensor data and the dimming settings data. In some examples, a turning point(s) may be utilized partway through the dimming settings adjustments because some dimming settings adjustments at the lower end may result in small differences (or no difference) in brightness and/or some dimming settings adjustments at the upper end may result in small differences (or no difference) in brightness (which may cause inaccuracy in determining a correct correspondence, for instance). In some examples, another dimming pattern may be utilized (e.g., stepping from 0% to 100% or 100% to 0% before, during, and/or after a sweep), which may be utilized to correlate and determine a correspondence between dimming settings data and light sensor data.

In some examples, the dimming profile processor 112 may determine a baseline brightness. For instance, the dimming profile processor 112 may receive light sensor data (e.g., a set of light measurements) from the light sensor 104 while the lighting load 122 is inactive (e.g., turned off, deactivated, etc.). For instance, ambient light (e.g., light from a window(s), skylight(s), etc.) may be present in the environment where the lighting load 122 is located. In some examples, the baseline brightness may be determined by averaging the light sensor data taken while the lighting load 122 is inactive. In some examples, the baseline brightness may be utilized to detect a change(s) (e.g., adjustment(s), step(s), etc.) in brightness indicated by the light sensor data from the dimming settings data (e.g., sweep). For instance, a threshold for detecting lighting load 122 activation may be adjusted to be above the baseline brightness.

In some examples, light sensor data may be averaged. For instance, multiple light samples corresponding to a dimming setting may be averaged and/or multiple light samples corresponding to different sweeps and/or patterns may be averaged to enhance data accuracy (e.g., reduce measurement noise). In some examples, multiple light sensors may be utilized. For instance, the dimming profile processor 112 may utilize light sensor data from multiple light sensors. In some examples, the dimming profile processor 112 may combine (e.g., average) light sensor data corresponding to a same lighting load 122 and/or lighting environment (e.g., room). In some examples, the dimming profile processor 112 may select light sensor data from a set of light sensor data. For instance, the dimming profile processor 112 may select light sensor data with better accuracy (e.g., less noisy measurements, better sensitivity, etc.). In some examples, the dimming profile processor 112 may utilize light sensor data corresponding to different lighting loads and/or lighting environments.

In some examples, the light sensor data and the dimming settings data may be captured in response to a trigger from a user interface. For instance, a touch screen on a mobile device may produce a trigger (e.g., one-touch trigger) in response to a user interaction (e.g., tap, swipe, etc.), a graphical user interface on a laptop may produce a trigger in response to a user interaction (e.g., mouse click), a button on an automation controller may produce a trigger in response to a user interaction (e.g., button press), a switch on a dimmer may produce a trigger in response to a user interaction (e.g., switch actuation), a smart speaker may produce a trigger in response to a user interaction (e.g., voice command), etc. In some examples, the trigger may start the adjustment (e.g., dimming settings sweep) and measurement (e.g., light sensor data capture).

In some examples, the adjustment (e.g., dimming settings sweep) and measurement (e.g., light sensor data capture) may be initiated automatically. For instance, the dimming profile processor 112 may initiate the adjustment and measurement when a connection(s) to a lighting load 122, dimmer 106, and/or light sensor 104 is detected for initial setup.

In some examples, the dimming profile processor 112 may determine a dimming profile based on the light sensor data and the dimming settings data. For instance, the dimming profile processor 112 may determine a first dimming level, a second dimming level, and/or a dimming curve.

In some examples, the dimming profile processor 112 may determine the dimming profile by determining a dimming setting at which the light sensor data indicates activation of the lighting load 122. For instance, the dimming profile processor 112 may determine a lowest dimming setting at which the light sensor data indicates an activation (e.g., increase in light 108, threshold increase in light 108, etc.) of the lighting load 122. In some examples, the dimming setting at which the light sensor data indicates activation may be set as a first dimming level (e.g., 1% dimming level, minimum activated dimming level, etc.). In some examples, a dimming setting below a setting at which the light sensor data indicates activation may be set as an inactive (or "off") dimming level (e.g., 0% dimming level).

In some examples, the dimming profile processor 112 may determine the dimming profile by determining a dimming setting at which the light sensor data and the dimming settings data indicate a slope less than a threshold. For instance, the dimming profile processor 112 may determine a dimming setting at which the light sensor data indicates an increase in brightness (e.g., lux, lumens, luminance channel value, nits, luminous flux, and/or candela, etc.) that is less than a threshold for a dimming setting adjustment (e.g., step). In some examples, the threshold may correspond to a slope at which a dimming setting adjustment(s) (e.g., step(s)) would result in an imperceptible change in brightness. Some examples of a threshold may include 0.1, 0.15, 0.2, 0.3 (in slope of perceived brightness to current percentage), 5%, 10%, 20% (in percentage lumen increase per step), 50, 100 lumen increase, 10% increase in luminance channel value, 15°, and/or 20°, etc. In some examples, a threshold may be expressed in one or more units (e.g., brightness per current, brightness per voltage, brightness per phase angle, brightness per duty cycle percentage, percentage brightness increase per percentage of physical dimming level, perceived brightness increase, etc.) and/or various quantities (e.g., 50 lumens, 100 lumens, 300 lumens, etc.). In some examples, the dimming setting at which the light sensor data and dimming settings data indicates a slope less than a threshold (or an immediately lower dimming setting) may be set as a second dimming level (e.g., 100% dimming level).

In some examples, the dimming profile may indicate a reduced range of dimming settings. For instance, the dimming profile may reduce a range of dimming settings from an entire physical dimming range (e.g., 0 current to a maximum current producible by the dimmer 106) to a reduced range of dimming settings (e.g., between the first dimming level and the second dimming level). For example, a reduced range of dimming settings may correspond to approximately 10% to 80% (or other values) of an entire physical dimming range. In some examples, the reduced range may be a range between a first dimming level where the lighting load 122 is activated to a second dimming level beyond which a further increase in current would result in less than a threshold increase in brightness (e.g., a small or imperceptible increase in brightness).

In some examples, the dimming profile processor 112 may determine the dimming profile by determining a dimming curve. A dimming curve is a mapping and/or function that maps a dimming setting(s) to a physical setting(s) and/or an electrical quantity(ies) (e.g., voltage(s) and/or current(s)). A dimming curve may include a linear or non-linear mapping and/or function. In some examples, a dimming curve may map a range of dimming settings (e.g., 0% to 100%) to a physical dimming range (e.g., 0% to 100% of a maximum output current of a dimmer, such as 20 milliamperes (mA), 30 mA, 200 mA, 3000 mA, etc.). For instance, a default dimming curve may be a linear mapping of dimming settings (e.g., 0% to 100%) to a range of dimming currents (e.g., 0 mA to 20 mA).

In some examples, the dimming profile processor 112 may determine a dimming curve that spans the reduced range of dimming settings described herein. For instance, the dimming curve may start at a first dimming setting (e.g., a 1% dimming level) at which the lighting load 122 activates and may end at a second dimming setting (e.g., a 100% dimming level) that meet a criterion (e.g., a second dimming setting beyond which the lighting load 122 produces less than a threshold change in brightness). In some examples, the dimming profile processor 112 may determine the dimming curve as a linear mapping between the first dimming setting and the second dimming setting. In some examples, the dimming profile processor 112 may determine the dimming curve as a logarithmic mapping between the first dimming setting and the second dimming setting. In some examples, the dimming curve may be determined to provide an approximately linear perceived brightness over the dimming range, which may correspond to a non-linear (e.g., logarithmic) mapping to a range of dimming currents. In some examples, the dimming curve may be determined to follow a custom mapping. For instance, a custom mapping may be scaled (e.g., compressed, expanded, transformed, etc.) to fit between the first dimming setting and the second dimming setting. An example of a mapping of a dimming curve is given in relation to FIG. 3.

In some examples of the techniques described herein, a characteristic(s) (e.g., type, performance, sensitivity, etc.) of the lighting load 122, the dimmer 106, and/or the light sensor 104 may be unavailable or unknown to the dimming profile processor 112 and/or electronic device 102. For instance, the dimming profile processor 112 and/or electronic device 102 may be installed and/or utilized in conjunction with an unidentified system element(s). In some examples, the lighting load 122, dimmer 106, and/or light sensor 104 may vary (e.g., a homeowner may change a lighting load 122 when an LED bulb fails, the sensitivity of a camera on a mobile device being utilized as a light sensor 104 may be unknown, and/or a range of output current of the dimmer 106 may be unknown, etc.). Some of the techniques described herein may allow a dimming profile to be determined regardless of the characteristic(s) of the lighting load 122, dimmer 106 and/or light sensor 104. For instance, the dimming profile processor 112 may utilize detected changes in brightness of light 108 produced by the lighting load 122 indicated by the light sensor data corresponding to an arbitrary range of dimming settings executed by the dimmer 106. Accordingly, some examples of the techniques described herein may be robustly utilized in a variety of lighting environments.

In some examples of the techniques described herein, a characteristic(s) (e.g., type, performance, sensitivity, etc.) of the lighting load 122, the dimmer 106, and/or the light sensor 104 may be determined by the dimming profile processor 112 and/or electronic device 102. For instance, the dimming profile processor 112 and/or electronic device 102 may detect and/or may receive information (e.g., identifying information, capability information, etc.) corresponding to the lighting load 122, the dimmer 106, and/or the light sensor 104. For instance, the lighting load 122, dimmer 106, and/or light sensor 104 may communicate the information to the dimming profile processor 112 and/or electronic device 102 via a communication link(s).

In some examples, the dimming profile processor 112 and/or electronic device 102 may perform image (e.g., text, symbol, quick response (QR) code, object, etc.) recognition to identify the lighting load 122, dimmer 106, and/or light sensor 104. For instance, a mobile device (e.g., smartphone, camera, etc.) may be utilized to capture an image(s) of the lighting load 122, dimmer 106, and/or light sensor 104. The image(s) may be communicated to the dimming profile processor 112 and/or electronic device 102. The dimming profile processor 112 and/or electronic device 102 may perform image (e.g., text, symbol, quick response (QR) code, object, etc.) recognition. In some examples, the image recognition may provide information (e.g., universal product code (UPC), manufacturer identifier, product number, label, etc.) that may be utilized to identify the lighting load 122, dimmer 106, and/or light sensor 104. For instance, the dimming profile processor 112 and/or electronic device 102 may look up the information in a database to identify the lighting load 122, dimmer 106, and/or light sensor 104. In some examples, the electronic device 102 may send the image(s) to a remote device (e.g., server(s)) to perform image recognition and/or to identify the lighting load 122, dimmer 106, and/or light sensor 104. The remote device may provide information to the dimming profile processor 112 and/or electronic device 102 identifying the lighting load 122, dimmer 106, and/or light sensor 104.

In some examples, the information (e.g., identifying information, capability information, etc.) may be utilized to reduce configuration time. For instance, the dimming profile processor 112 and/or electronic device 102 may determine a lighting load identifier and may determine a default dimming profile based on the lighting load identifier. In some examples, the dimming profile processor 112 and/or electronic device 102 may look up a default dimming profile (e.g., look up a dimming profile from local database and/or from a remote database, etc.) corresponding to an identified component(s) (e.g., lighting load 122, dimmer 106, and/or light sensor 104). For instance, a database may include a default dimming profile(s) corresponding to an identified component(s) (e.g., lighting load(s), dimmer(s), and/or light sensor(s)). In some examples, the default dimming profile(s) may have been previously determined. For instance, the dimming profile processor 112 may have determined a default dimming profile for a lighting load type in a first lighting environment (e.g., room). If the same type of lighting load is identified for a second lighting environment, the dimming profile processor 112 and/or electronic device 102 may look up and/or utilize the default dimming profile. In some examples, the default dimming profile may be utilized without performing a sweep of dimming settings for the second lighting environment, for example. In some examples, the default dimming profile may be utilized (e.g., scaled, transformed, etc.) in conjunction with a first dimming setting and a second dimming setting determined for the second lighting environment.

In some examples, the adjustment (e.g., dimming settings sweep), measurement (e.g., light sensor data capture), and/or dimming profile may be repeated. For instance, one or more of the procedures described herein may be repeated to perform a recalibration. For instance, a procedure(s) may be initiated based on a trigger from a user interface or may be initiated automatically. For instance, the dimming profile processor 112 may initiate adjustment, measurement, and/or dimming profile determination when a change is detected in the lighting load 122 or when a trigger is detected from a user interface.

Figure 2:
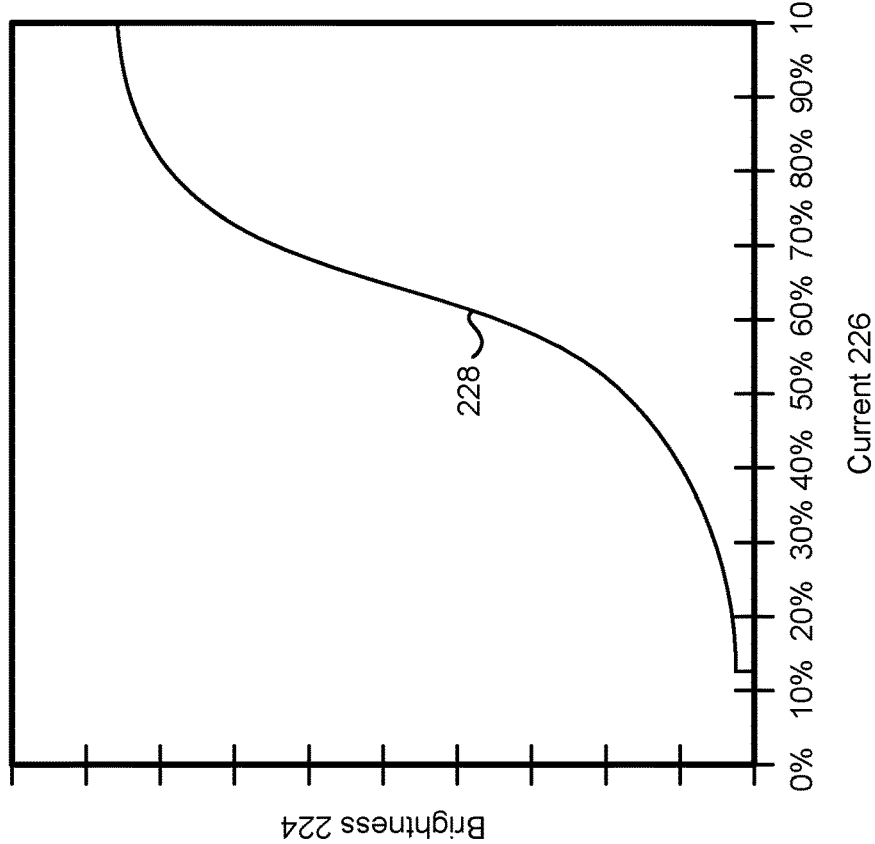
FIG. 2 is a graph illustrating an example of a plot of light sensor data in brightness over current.

FIG. 2 is a graph illustrating an example of a plot of light sensor data 228 in brightness 224 (e.g., lumens) over current 226. For instance, FIG. 2 illustrates measured brightness of light (e.g., light 108) produced by a lighting load (e.g., lighting load 122) over a range of current provided by a dimmer. In some examples, the brightness 224 may be expressed on a linear, logarithmic, or perceptual brightness scale. In the example of FIG. 2, the current 226 is illustrated in a percentage over a range of current that can be produced by a dimmer. For instance, 0% may correspond to 0 mA and 100% may correspond to 20 mA.

In some examples of the techniques described herein, the light sensor data 228 may be obtained by controlling a dimmer to produce current over a range of dimming settings. For instance, dimming settings data may be provided to a dimmer, which may sweep a physical dimming range (e.g., 0% to 100% or 0 mA to 20 mA) as described in relation to FIG. 1. In some examples, the dimming settings data (e.g., default dimming settings from 0% to 100%) may correspond to the percentage of current driven (e.g., 0% to 100%) from the dimmer during the sweep.

As illustrated in FIG. 2, the lighting load (e.g., an LED load) may not produce light until the current 226 reaches approximately 12% (e.g., 2.4 mA). Additionally, the measured brightness increases at a smaller slope after the current 226 reaches approximately 82% (e.g., 16.4 mA).

Figure 3:
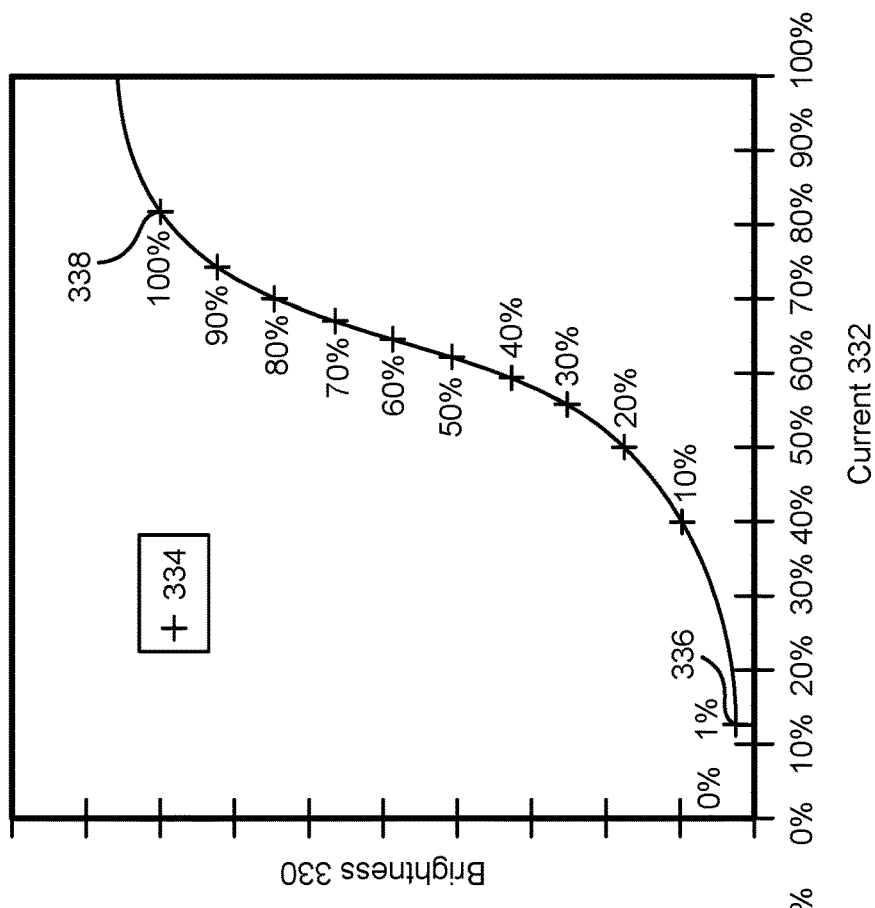
FIG. 3 is a graph illustrating an example of a dimming profile determined based on the light sensor data described in relation to FIG. 2.

FIG. 3 is a graph illustrating an example of a dimming profile 334 determined based on the light sensor data 228 described in relation to FIG. 2. In this example, the graph is illustrated in brightness 224 (e.g., lumens) over current 226. In some examples, the brightness 330 may be expressed on a linear, logarithmic, or perceptual brightness scale. FIG. 3 illustrates a dimming profile 334 in crosses over the plot of light sensor data 228. A dimming profile processor may determine the dimming profile 334 as described in relation to FIG. 1 in some examples.

In the example of FIG. 3, the dimming profile processor may determine a first dimming setting 336 at which the light sensor data indicates activation of the lighting load. For instance, the dimming profile may indicate a first dimming setting 336 (e.g., 12% current) that may be mapped to a first dimming level (e.g., 1% dimming level, "low" dimming level, etc.) of the dimming profile 334. In some examples, the first dimming level may be mapped approximately to (e.g., slightly above) a minimum current where the light load is activated. For instance, a 1% dimming level may be mapped to a 13%, 14%, or 15% dimming setting (e.g., current).

In the example of FIG. 3, the dimming profile processor may determine a second dimming setting 338 at which the light sensor data and/or the dimming settings data indicate(s) a criterion (e.g., slope less than a slope threshold, diminishing return for additional current, less than a threshold step size, imperceptible change in brightness for further current, less than a threshold difference in brightness between brightness at the dimming setting and a global maximum brightness, etc.). For instance, the dimming profile may map a second dimming level (e.g., 100% dimming level) of the dimming profile 334 to the second dimming setting 338 (e.g., 82% current). As illustrated in FIG. 3, the dimming profile 334 indicates a reduced range of dimming settings (e.g., 12% to 82%).

As illustrated in FIG. 3, the dimming profile processor may determine a dimming curve. For instance, the dimming profile processor may map dimming levels of a dimming profile 334 to dimming settings (or dimming settings to dimming levels, for example). In the example of FIG. 3, the dimming curve linearly maps the reduced range of dimming settings (e.g., from 12% to 82% current corresponding to a range of brightness) to a range of dimming levels (e.g., 1% dimming level to 100% dimming level). For instance, the dimming curve may map a 12% current to a 1% dimming level, a 40% current to a 10% dimming level, a 50% current to a 20% dimming level, a 56% current to a 30% dimming level, a 59% current to a 40% dimming level, a 63% current to a 50% dimming level, a 65% current to a 60% dimming level, a 68% current to a 70% dimming level, a 71% current to an 80% dimming level, a 74% current to a 90% dimming level, and an 82% current to a 100% dimming level, etc., to produce an approximately linear brightness increase over the dimming level range. Other dimming levels (e.g., 2%, 6%, 53%, 64%, etc.) may follow the linear scale and/or may be interpolated. Other mappings (e.g., logarithmic, perceptual, etc.) may be utilized to determine a dimming curve (e.g., to determine how the dimming levels are mapped to the dimming settings) in some examples.

Figure 4:
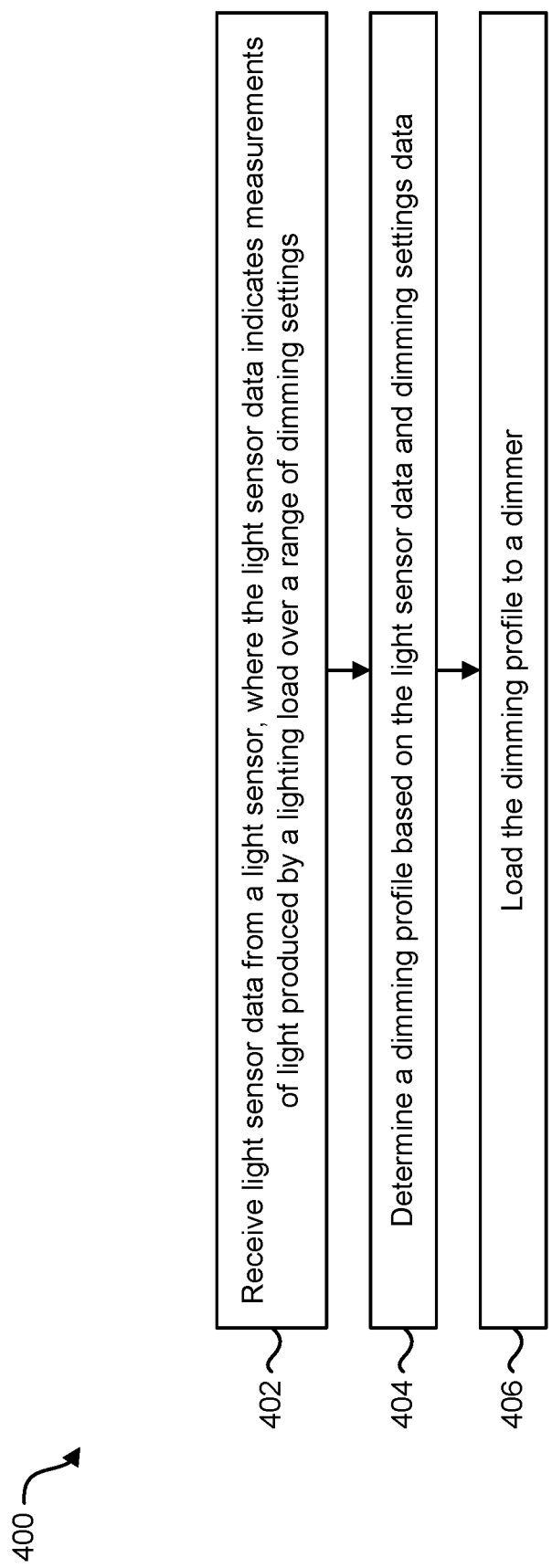
FIG. 4 is a flow diagram illustrating one configuration of a method for determining a dimming profile.

FIG. 4 is a flow diagram illustrating one configuration of a method 400 for determining a dimming profile. In some examples, the method 400 may be performed by the electronic device 102 described in relation to FIG. 1. An electronic device may receive 402 light sensor data from a light sensor, where the light sensor data indicates measurements of light produced by a lighting load over a range of dimming settings. This may be accomplished as described in relation to FIG. 1. For example, a light sensor may measure the brightness of light produced by a lighting load over a range of dimming settings. The light sensor may send the light sensor data (e.g., brightness measurements) to the electronic device. For instance, the light sensor may send the light sensor data to the electronic device via a wired and/or wireless (e.g., wired and/or wireless network) link. In some examples, the light sensor may be included in the electronic device and may send the light sensor data to a processor and/or memory of the electronic device via an internal bus. In some examples, the electronic device and/or the light sensor may initiate and/or control the measurement. For instance, the electronic device may initiate measurement based on a trigger from a user interface and/or in response to a message received from another device.

In some examples, the electronic device may initiate the range of dimming settings and/or may control a dimmer to execute the range of dimming settings. For instance, the electronic device may send the dimming settings to an automation controller and/or to dimmer to control a lighting load in accordance with the dimming settings. In some examples, the electronic device may receive the dimming settings (e.g., dimming settings data) from another device (e.g., from an automation controller).

The electronic device may determine 404 a dimming profile based on the light sensor data and dimming settings data. In some examples, determining 404 the dimming profile may be performed as described in relation to one or more of FIGS. 1-3. For instance, the electronic device may determine a first dimming setting, a second dimming setting, and a dimming curve. For instance, determining 404 the dimming profile may include determining a first dimming setting at which the light sensor data indicates activation of the lighting load. In some examples, determining 404 the dimming profile may include determining a second dimming setting at which the light sensor data and/or the dimming settings data indicate a criterion (e.g., a slope less than a slope threshold, less than a threshold change in brightness at 100% current, etc.). In some examples, the electronic device may determine the dimming profile as a mapping between a dimming level(s) and the first dimming setting, the second dimming setting, and/or the dimming curve.

In some examples, the electronic device may load 406 the dimming profile to a dimmer. For instance, the electronic device may send the dimming profile (e.g., data representing the dimming profile) to a dimmer. In some examples, the electronic device may send the dimming profile to the dimmer via a wired and/or wireless (e.g., wired and/or wireless network) link and/or via a home automation controller. The dimmer may store the dimming profile and/or may operate dimming in accordance with the dimming profile. For instance, if the dimming profile maps a 1% dimming level to 12% current, the dimmer may output 12% current when the dimmer is set to the 1% dimming level.

Figure 5:
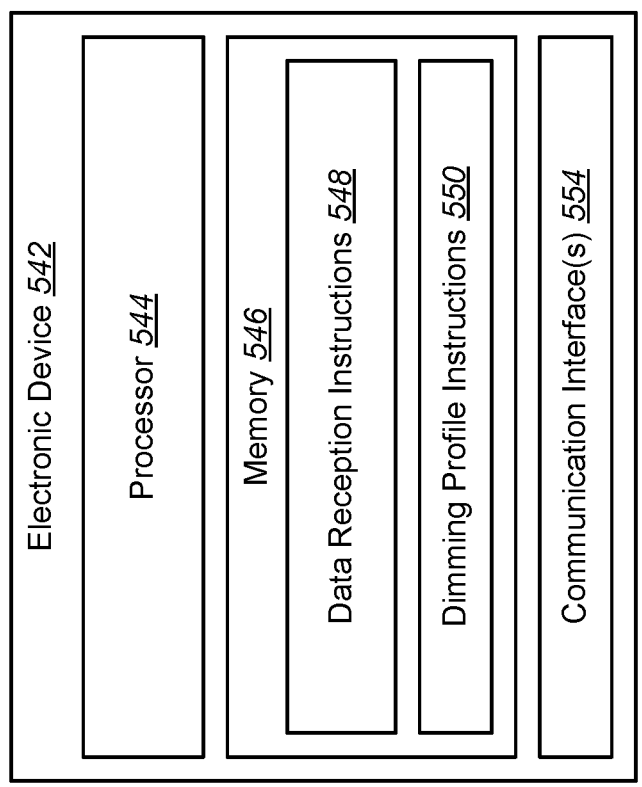
FIG. 5 is a block diagram illustrating one example of an electronic device in which systems and methods for determining a dimming profile may be implemented.

FIG. 5 is a block diagram illustrating one example of an electronic device 542 in which systems and methods for determining a dimming profile may be implemented. The electronic device 542 may be an example of the electronic device 102 described in relation to FIG. 1. In some examples, the electronic device 542 may be a mobile device (e.g., smartphone, tablet device, laptop computer, etc.), automation controller, light meter, smart speaker, and/or dimmer, etc. The electronic device 542 may include one or more components or elements. One or more of the components or elements may be implemented in hardware (e.g., circuitry), a combination of hardware and software (e.g., a processor with instructions), and/or a combination of hardware and firmware.

In some configurations, the electronic device 542 may include a processor 544, a memory 546, and/or one or more communication interfaces 554. The processor 544 may be coupled to and/or linked to (e.g., in electronic communication with) the memory 546 and/or communication interface(s) 554.

In some configurations, the electronic device 542 may be configured to perform one or more of the functions, procedures, methods, steps, etc., described in connection with one or more of FIGS. 1-8. Additionally or alternatively, the electronic device 542 may include one or more of the structures described in connection with one or more of FIGS. 1-8.

The memory 546 may store instructions and/or data. The processor 544 may access (e.g., read from and/or write to) the memory 546. Examples of instructions and/or data that may be stored by the memory 546 may include data reception instructions 548, dimming profile instructions 550, and/or other instructions and/or data, etc. For instance, the memory 546 may store light sensor data, dimming settings data, and/or dimming profile data (e.g., first dimming setting, second dimming setting, and/or dimming curve data). In some examples, the memory 546 may be a non-transitory tangible computer-readable medium. In some examples, the processor 544 may be configured to perform one or more of the operations described herein without a memory 546. For instance, one or more operations may be implemented in hardware of the processor 544 and/or the electronic device 542 may not include the memory 546.

The communication interface 554 may enable the electronic device 542 to communicate with one or more other devices (e.g., light sensor(s), automation controller(s), dimmer(s), and/or one or more other devices). For example, the communication interface 554 may provide an interface for wired and/or wireless communications. For example, the communication interface 554 may include a transmitter and/or a receiver. In some configurations, the communication interface(s) 554 may communicate with one or more other devices (e.g., light sensor(s), automation controller(s), dimmer(s), and/or one or more other devices) over one or more networks (e.g., the Internet, wide-area network (WAN), local area network (LAN), etc.). In some configurations, the communication interface 554 may be coupled to one or more antennas for transmitting and/or receiving radio frequency (RF) signals. For example, the communication interface 554 may enable one or more kinds of wireless (e.g., cellular, wireless local area network (WLAN), personal area network (PAN), mesh network, etc.) communication. Additionally or alternatively, the communication interface 554 may enable one or more kinds of cable and/or wireline (e.g., Universal Serial Bus (USB), Ethernet, High Definition Multimedia Interface (HDMI), fiber optic cable, etc.) communication.

In some examples, the processor 544 may execute the data reception instructions 548 to receive, by the electronic device 542, light sensor data from a light sensor. The light sensor data may indicate measurements of light produced by a lighting load over a range of dimming settings. In some examples, receiving the light sensor data may be performed as described in relation to FIG. 1 and/or FIG. 4. For instance, the electronic device 542 may receive light sensor data over a communication link from a remote light sensor and/or may receive light sensor data from a light sensor included in the electronic device 542. In some examples, the light sensor data may be stored in the memory 546. In some examples, the light sensor data may be captured in response to a trigger from a user interface. For instance, the electronic device 542 may include a user interface (e.g., touchscreen, keyboard, mouse, etc.). In response to a trigger from the user interface, the electronic device 542 may initiate a dimming sweep and receive corresponding light sensor data. In some examples, the electronic device 542 may receive a message from another device (e.g., mobile device) that includes a user interface that produced the trigger. In response to the message, the electronic device 542 may initiate the dimming sweep and receive corresponding light sensor data.

In some examples, the electronic device 542 may include a light sensor. The electronic device 542 may be configured to generate light sensor data according to a signal output by the light sensor. The signal output by the light sensor may indicate measurements of light emitted from a lighting load. For example, the light sensor data may indicate a first set of the measurements of light emitted from the lighting load over a first range of dimming settings.

In some examples, the processor 544 may execute the dimming profile instructions 550 to determine, by the electronic device 542, a dimming profile based on the light sensor data and dimming settings data. In some examples, determining the dimming profile may be performed as described in relation to one or more of FIGS. 1-4. In some examples, dimming settings data may be stored in the memory 546. In some examples, the electronic device 542 (e.g., communication interface 554) may transmit a signal including information indicating the determined dimming profile to a device via a network connection with the device. For instance, the electronic device 542 may send the dimming profile data to an automation controller and/or a to a dimmer to control the lighting load over the range of dimming settings. In some examples, the electronic device 542 may receive the dimming profile data from an automation controller and/or from a dimmer. The processor 544 may utilize the light sensor data and the dimming settings data to determine the dimming profile as described herein. For instance, determining the dimming profile may include determining a first dimming setting at which the light sensor data indicates activation of the lighting load.

Figure 6:
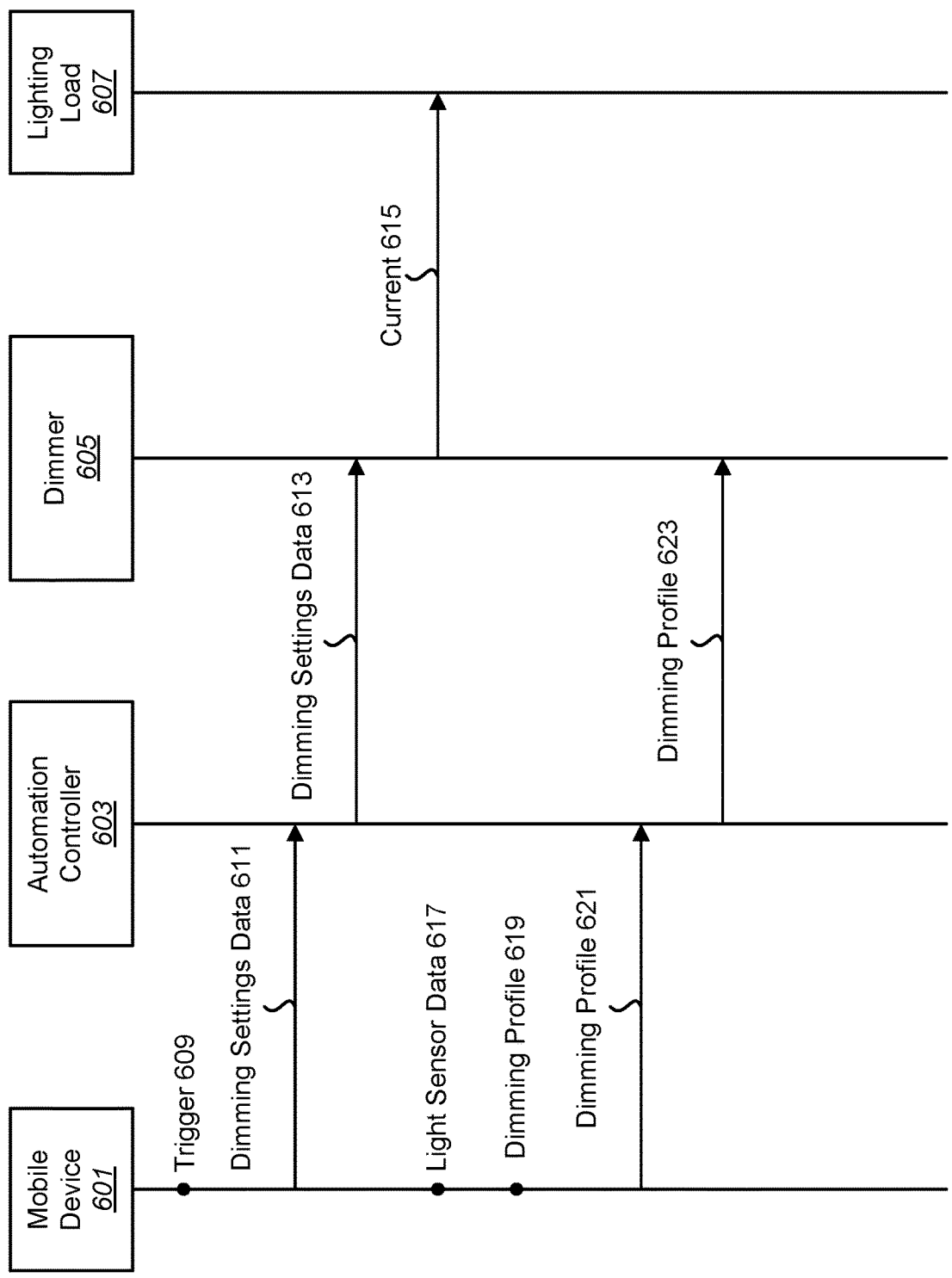
FIG. 6 is a thread diagram illustrating an example of dimming profile determination in accordance with some examples of the systems and methods described herein.

FIG. 6 is a thread diagram illustrating an example of dimming profile determination in accordance with some examples of the systems and methods described herein. FIG. 6 illustrates an example of a mobile device 601, an automation controller 603, a dimmer 605, and a lighting load 607. The mobile device 601 may be an example of one or more of the electronic devices described herein.

The mobile device 601 may detect a trigger 609. For instance, a user interface on the mobile device 601 may detect a user input (e.g., tap, user interface event, etc.) to detect the trigger 609. In some examples, the mobile device 601 may include an application that may be executed to perform one or more of the operations described in relation to the mobile device.

In response to the trigger 609, the mobile device 601 may send dimming settings data 611 to the automation controller 603. The automation controller 603 may send (e.g., forward) the dimming settings data 613 to the dimmer 605.

In response to the dimming settings data 613, the dimmer 605 may produce a current 615 (e.g., a range, steps, and/or sweep of current corresponding to the dimming settings). The lighting load 607 may produce light according to the current 615.

The mobile device 601 may capture light sensor data 617 based on the light produced by the lighting load 607. For instance, the mobile device 601 may capture and/or determine measurements of light based on images captured by an integrated camera.

The mobile device 601 may determine a dimming profile 619 based on the light sensor data and the dimming settings data. The mobile device 601 may send the dimming profile 619 to the automation controller 603. The automation controller 603 may send (e.g., load) the dimming profile 623 to the dimmer 605. The dimmer may perform dimming based on the dimming profile.

Figure 7:
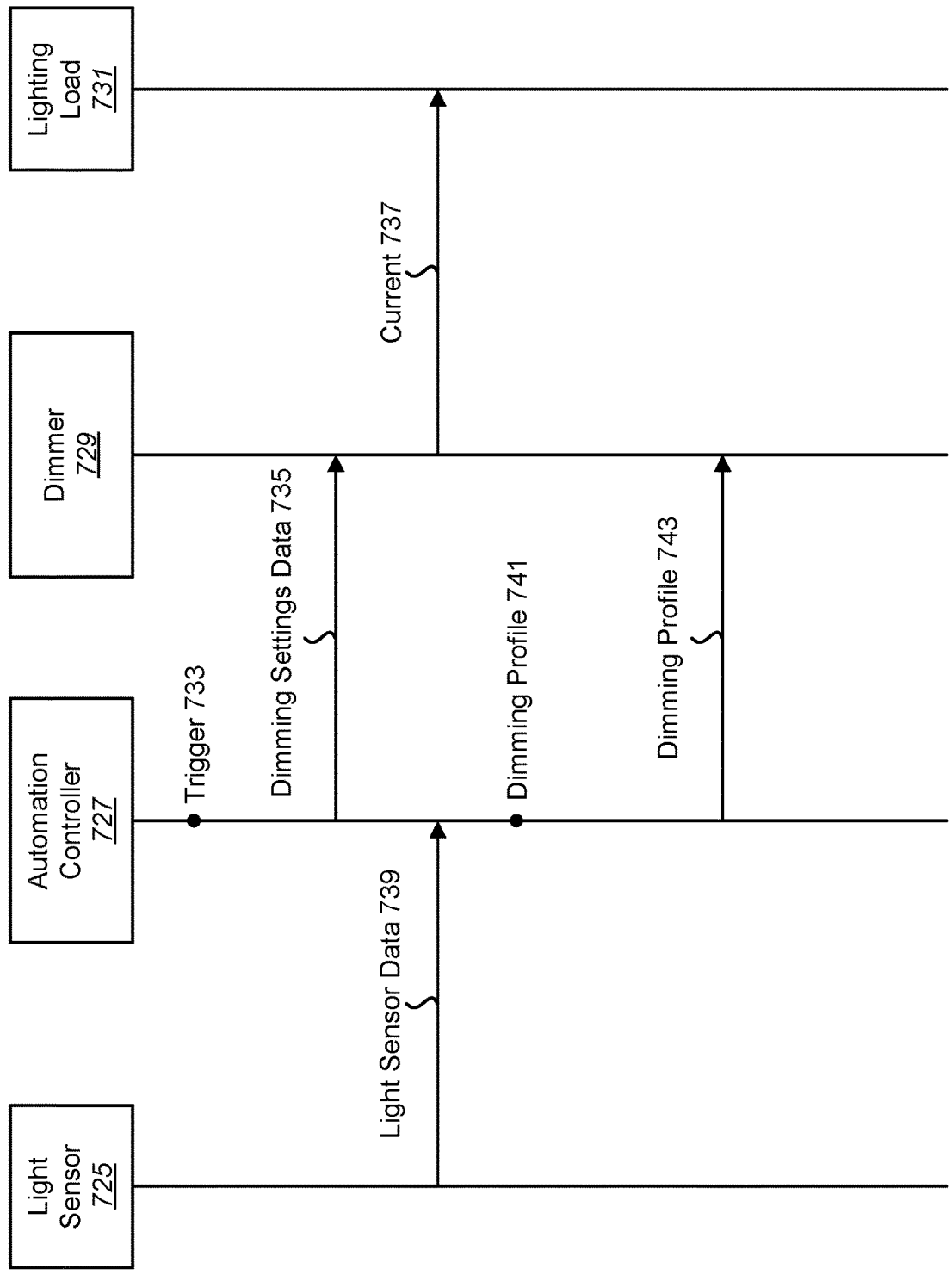
FIG. 7 is a thread diagram illustrating another example of dimming profile determination in accordance with some examples of the systems and methods described herein.

FIG. 7 is a thread diagram illustrating another example of dimming profile determination in accordance with some examples of the systems and methods described herein. FIG. 7 illustrates an example of a light sensor 725, an automation controller 727, a dimmer 729, and a lighting load 731. The automation controller 727 may be an example of one or more of the electronic devices described herein.

The automation controller 727 may detect a trigger 733. For instance, a user interface on the automation controller 727 may detect a user input or the automation controller 727 or may receive a message from a remote device indicating the trigger 733. In some examples, the automation controller 727 may include an application that may be executed to perform one or more of the operations described in relation to the automation controller 727.

In response to the trigger 733, the automation controller 727 may send dimming settings data 735 to the dimmer 729. In response to the dimming settings data 735, the dimmer 729 may produce a current 737 (e.g., a range, steps, and/or sweep of current corresponding to the dimming settings). The lighting load 731 may produce light according to the current 737.

The light sensor 725 may capture light sensor data based on the light produced by the lighting load 731. The light sensor data 739 may be sent to the automation controller 727. In some examples, the automation controller 727 may request the light sensor data 739 from the light sensor 725.

The automation controller 727 may determine a dimming profile 741 based on the light sensor data and the dimming settings data. The automation controller 727 may send the dimming profile 743 to the dimmer 729. The dimmer 729 may perform dimming based on the dimming profile.

While examples of arrangements of devices for performing some examples of the techniques are described herein are given in relation to the Figures, other arrangements may be utilized in some examples. For instance, a dimmer including a light sensor may control a lighting load, capture light sensor data, and determine a dimming profile. In another example, a mobile device may control a dimmer, capture light sensor data, determining a dimming profile, and load the dimming profile to the dimmer. Other arrangements may be utilized in some examples.

Figure 8:
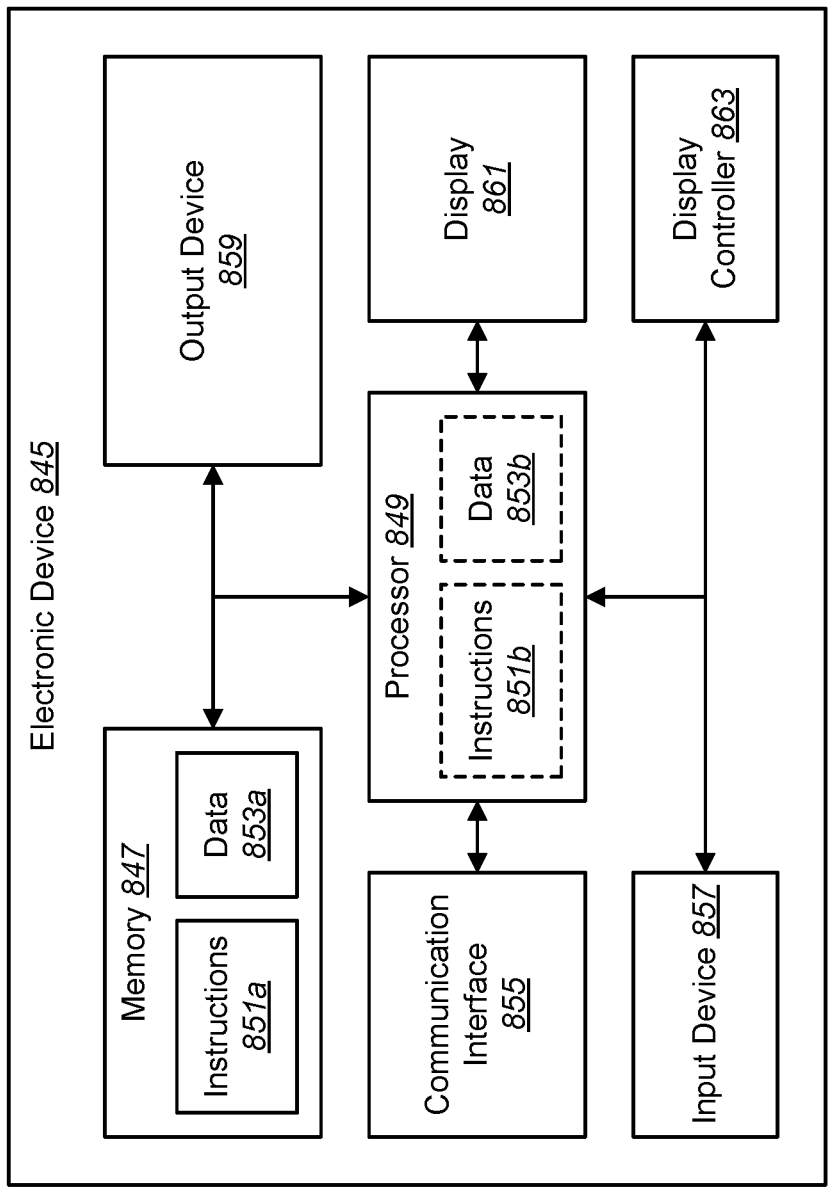
FIG. 8 illustrates various components that may be utilized in an electronic device.

FIG. 8 illustrates various components that may be utilized in an electronic device 845. The electronic device 845 described in connection with FIG. 8 may be configured in accordance with one or more of the electronic devices (e.g., electronic device 102, electronic device 542, mobile device 601, automation controller 727, etc.) described herein. For example, the electronic device 845 may be configured to perform one or more of the methods (e.g., method 400), operations, procedures, and/or techniques described herein. The electronic device 845 may include a memory 847, a communication interface 855, an input device 857, a processor 849, an output device 859, a display 861, and/or a display controller 863. In some examples, the electronic device 845 may include one or more additional components (not shown in FIG. 8), such as one or more resistors, capacitors, transistors, MOSFETs, TRIACs, and/or variable transformers, etc. The memory 847 may store instructions 851a and data 853a. The processor 849 may operate on instructions 851b and data 853b. In some examples, one or more of the components described in relation to FIG. 8 may be omitted and/or combined. Some configurations of the electronic device 845 may be controlled on a remote display device (e.g., a touch panel) with communication through a remote device (e.g., a controller, home automation controller, etc.).

As used herein, the term "circuit," "circuitry" or variations thereof may refer to one or more electronic and/or electrical circuits. In some examples, a circuit may include one or more discrete components such as one or more resistors, capacitors, inductors, transformers, transistors, etc. Examples of circuitry may include dimming circuitry, a processor, an image sensor, etc. In some examples, circuitry may be included in an electronic device. In some configurations, an electronic device may be housed within a wall box.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An electronic device, comprising:
   a dimming profile processor configured to:
   receive light sensor data from a light sensor, wherein the light sensor data indicates measurements of light produced by a lighting load over each range of dimming settings;
   send dimming settings data indicating a sequence of dimming settings to a dimmer to command a sequential sweep across the range of dimming settings;
   for each dimming setting in the sequence, associate a contemporaneous light measurement from the light sensor data with the dimming setting to generate paired data that maps dimming settings to corresponding measured light;
   determine a dimming profile by compiling the paired data; and
   control circuitry of a dimmer to drive the lighting load over the range of dimming settings.

2. The electronic device of claim 1, wherein the light sensor data and the dimming settings data are captured in response to a trigger from a user interface.

3. The electronic device of claim 1, wherein the dimming profile indicates a reduced range of the dimming settings.

4. The electronic device of claim 1, wherein the dimming profile processor is configured to determine the dimming profile by determining a first dimming setting at which the light sensor data indicates activation of the lighting load.

5. The electronic device of claim 4, wherein the dimming profile processor is configured to determine the dimming profile by determining a second dimming setting at which the light sensor data and the dimming settings data indicate a slope less than a slope threshold.

6. The electronic device of claim 1, wherein the dimming profile processor is configured to determine the dimming profile by determining a dimming curve.

7. The electronic device of claim 1, wherein the dimming profile processor is configured to:
   determine a lighting load identifier; and
   determine a default dimming profile based on the lighting load identifier.

8. The electronic device of claim 1, wherein the electronic device is an automation controller.

9. The electronic device of claim 1, wherein the electronic device is a mobile device.

10. The electronic device of claim 1, wherein the electronic device is a dimming device.

11. The electronic device of claim 1, wherein the light sensor is included in a mobile device.

12. The electronic device of claim 1, wherein the light sensor is included in a stationary device.

13. A method comprising:
   receiving, by an electronic device, light sensor data from a light sensor, wherein the light sensor data indicates measurements of light produced by a lighting load over a range of dimming settings;
   sending, by the electronic device, dimming settings data indicating a sequence of dimming settings to a dimmer to command a sequential sweep across the range of dimming settings;
   for each dimming setting in the sequence, associating, by the electronic device, a contemporaneous light measurement from the light sensor data with the dimming setting to generate paired data that maps dimming settings to corresponding measured light;
   determining, by the electronic device, a dimming profile based on the light sensor data and dimming settings data by compiling the paired data; and
   controlling, by the electronic device, circuitry of a dimmer to drive the lighting load over the range of dimming settings.

14. The method of claim 13, wherein the light sensor data and the dimming settings data are captured in response to a trigger from a user interface.

15. The method of claim 13, wherein determining the dimming profile comprises determining a first dimming setting at which the light sensor data indicates activation of the lighting load.

16. The method of claim 15, wherein determining the dimming profile comprises determining a second dimming setting at which the light sensor data and the dimming settings data indicate a slope less than a slope threshold.

17. A first device comprising:
   circuitry including at least a processor, a transmitter, a receiver, and a light sensor, the circuitry configured to:
      generate light sensor data according to a signal output by the light sensor, wherein the signal output by the light sensor indicates measurements of light emitted from a lighting load, and wherein the light sensor data indicates a first set of the measurements of light emitted from the lighting load over a first range of dimming settings;
      send dimming settings data indicating a sequence of dimming settings to a dimmer to command a sequential sweep across the first range of dimming settings;
      for each dimming setting in the sequence, associate a contemporaneous light measurement from the light sensor data with the dimming setting to generate paired data that maps dimming settings to corresponding measured light;
      determine a dimming profile based on the light sensor data and dimming settings data by compiling the paired data;
      control circuitry of a dimmer to drive the lighting load over the range of dimming settings; and
      transmit a signal including information indicating the determined dimming profile to a second device via a network connection with the second device.

18. The first device of claim 17, wherein the first device is a mobile device.

19. The first device of claim 18, wherein the light sensor is included in the mobile device.

* * * * *